Aug. 17, 1954
E. C. LEMMOND
2,686,384
DUST DISTRIBUTOR
Filed Dec. 4, 1950
2 Sheets-Sheet 1
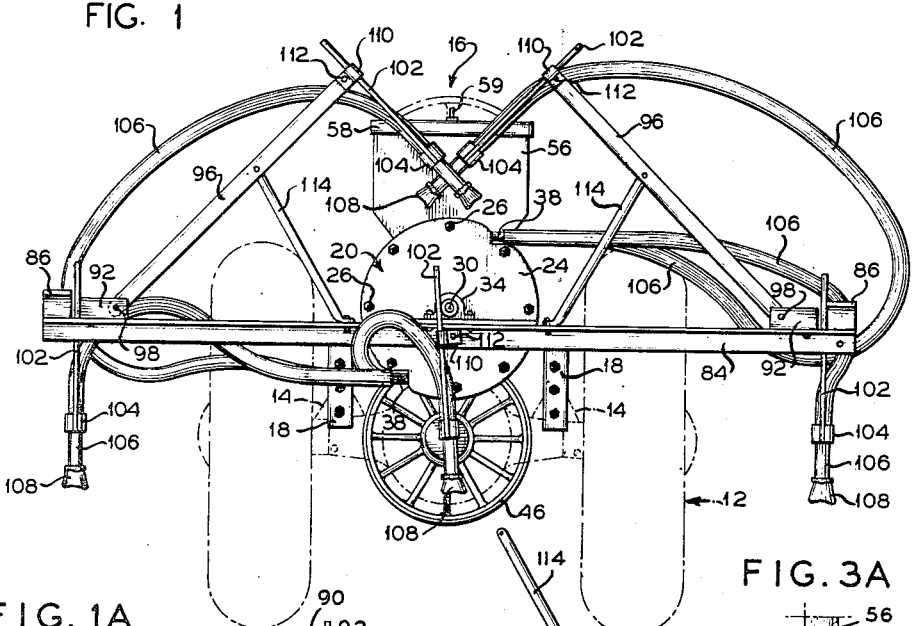
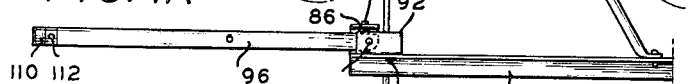
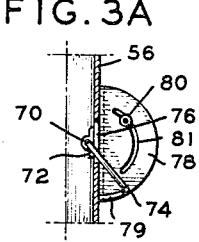
INVENTOR.
E. C. LEMMOND
BY
A. Yates Dowell
ATTORNEY Aug. 17, 1954  E. C. LEMMOND  2,686,384
DUST DISTRIBUTOR
Filed Dec. 4, 1950  2 Sheets-Sheet 2
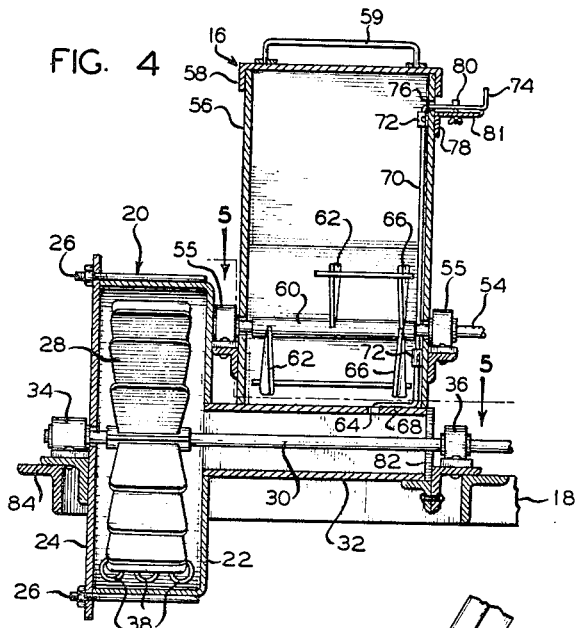
FIG. 4
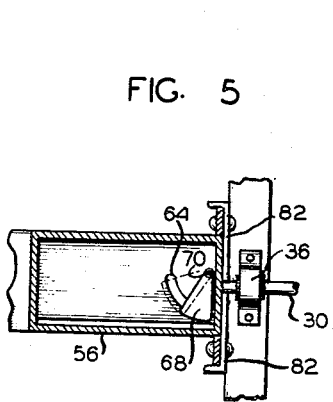
FIG. 5
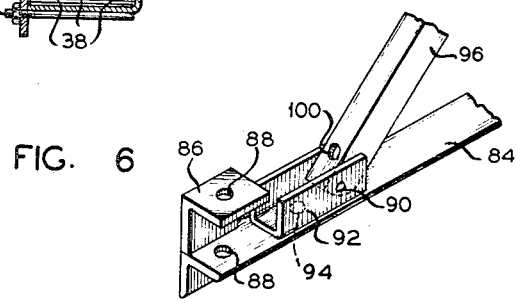
FIG. 6
FIG. 7
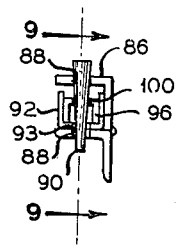
FIG. 8
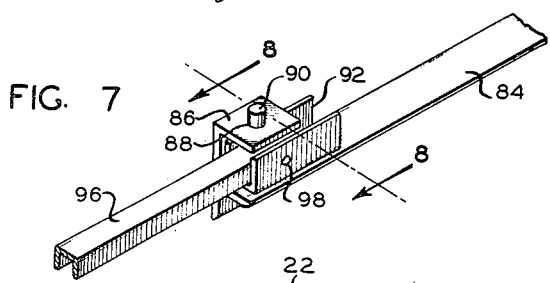
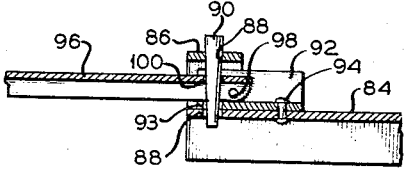
FIG. 9
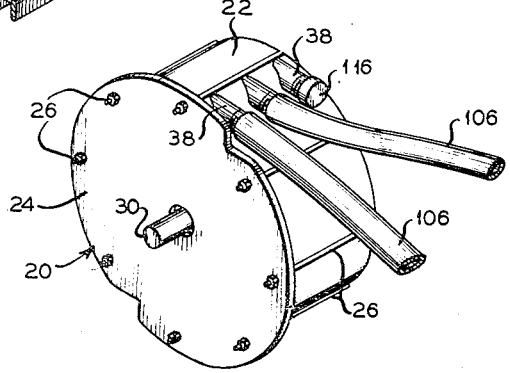
FIG. 10
INVENTOR.
E. C. LEMMOND
BY
A. Yates Dowell
ATTORNEY Patented Aug. 17, 1954

2,686,384

UNITED STATES PATENT OFFICE 2,686,384

DUST DISTRIBUTOR

Everett C. Lemmond, Somerville, Ala.

Application December 4, 1950, Serial No. 199,022

3 Claims. (Cl. 43—148)

This invention relates to agricultural implements and more particularly to dust distribution or crop dusting attachments for tractors and similar vehicles.

There are many different types of crop dusting apparatus in common use at the present time; however, they have many disadvantages, in that they are awkward and inconvenient to operate, are easily damaged, and are too complicated and expensive to manufacture.

It is therefore an object of this invention to overcome the disadvantages enumerated above and provide a simple, inexpensive crop dusting apparatus which is easy to operate and which is not readily damaged during normal use.

Another object of the present invention is to provide a crop dusting apparatus with a feed hopper which is readily adjusted and controlled from the driver's seat and which feed hopper assures a continual and uniform supply of the powdered insecticide to the blower.

A still further object of the present invention is to provide a novel arrangement of the bearings and air supply whereby the wear on the bearings is minimized and the flow of air is readily controlled for an optimum relation between the insecticide powder fed and the air flow for maximum, minimum or any intermediate adjustments.

A still further object of the present invention is the provision of a novel arrangement of the outer frame sections whereby the damage thereto during normal field operations is minimized and whereby the outer frame sections may be folded inwardly to facilitate moving the apparatus through relatively narrow spaces or along the highway.

Further objects and advantages of the invention will be apparent from the following description taken in conjunction with the accompanying drawings, wherein:

Fig. 1 is a rear elevational view showing one preferred form of the crop duster of the present invention attached to a conventional tractor shown in phantom;

Fig. 1A, a fragmentary view showing a portion of the duster nozzle support;

Fig. 2, a side elevational view of the apparatus shown in Fig. 1;

Fig. 3, a sectional view taken on the line 3—3 of Fig. 2;

Fig. 3A, a fragmentary plan view of the dust flow control;

Fig. 4, a sectional view taken on the line 4—4 of Fig. 3, on an enlarged scale;

Fig. 5, a sectional view taken on the line 5—5 of Fig. 4;

Fig. 6, a fragmentary perspective view of the universal connection between the main frame and the outer frame sections in their folded position;

Fig. 7, a fragmentary perspective view similar to Fig. 6 showing the outer frame member in extended position;

Fig. 8, a sectional view taken on the line 8—8 of Fig. 7;

Fig. 9, a sectional view taken on the line 9—9 of Fig. 8; and

Fig. 10, a perspective view of the blower housing with flexible conduits attached to two of the outlets and with one of the outlets stopped off.

Referring now to the drawings in detail, a tractor 12 of conventional construction is generally indicated by phantom lines in Figs. 1 and 2 with the usual mounting bracket 14 attached to the rear axle thereof.

One preferred form of the crop dusting apparatus of the present invention is generally indicated by the numeral 16 and is provided with a framework 18 attached by rivets, bolts or similar fastening means to the bracket 14. The framework 18 may be made up of angle iron suitably welded and braced to form a rigid and substantial supporting structure for the crop dusting apparatus. A blower 20, consisting of a housing 22 secured to an end wall 24 by means of bolts and nuts 26 and with a rotor 28 mounted on a shaft 30 extending axially through a tubular inlet conduit 32, is mounted on the framework 18. Shaft 30 is rotatably mounted in bearings 34 and 36 and the housing 22 is provided with a plurality of threaded outlet connections 38.

One end of shaft 30 is provided with pulleys 40 and 42, pulley 42 being driven by a belt 44 from a large drive pulley 46 on the power drive shaft 48 of the tractor 12. Pulley 40 by means of belt 50 drives a slightly larger pulley 52 mounted on the shaft 54 which is mounted in bearings 55 and extends through the lower portion of the feed hopper 56 which is mounted over the tubular inlet 32.

The feed hopper 56 is provided with a cover 58 having a handle 59 and is adapted to receive a quantity of powdered insecticide. Shaft 54 has an agitator 60 mounted thereon within the lower portion of the hopper 56, the agitator 60 being provided with blades 62 which feed the material towards an arcuate slot 64 formed in the bottom of the hopper and the upper portion of the tubular inlet 32 and blades 66 which are disposed at a suitable angle to work the material back and forth across the slot 64. This arrangement will ensure the discharge of substantially all of the powdered insecticide from the hopper 56 through the arcuate slot 64.

The flow of powdered insecticide through the slot 64 is controlled by a plate 68 secured to the end of a vertical rod 70 which is pivotally mounted in brackets 72 secured to an end wall of the hopper 56. The control handle 74, integrally formed on the rod 70, extends through a suitable opening 76 in the side wall of the hopper 56 and is disposed immediately above a bracket 78 which is provided with an upwardly extending flange 79 and adjustable stop means 80 mounted in a curved slot 81. By means of this arrangement the adjustable stop 80 may be set for the optimum maximum flow of powdered insecticide through the arcuate slot 64 and the control handle 74 may be quickly thrown by the operator from a cut-off position against the end of flange 79 to the preset open position against stop 80.

The quantity of air is controlled by the two slidably mounted plates 82 which are mounted on opposite sides of the shaft 30. Screws 82' extending through slots 82" provide means for this adjustment. This arrangement is extremely advantageous, since the air may be directed axially through the central portion of the tubular inlet 32 directly under the portion of the slot 64 which is open during minimum flow conditions.

The transverse frame member 84 is rigidly connected to the frame 18 rearwardly of the blower 20 and is provided with brackets 86 adjacent both of its outer ends. Each of the brackets 86 and the frame member 84 has aligned openings 88 through which a shear pin 90 is adapted to extend, as shown in Figs. 7, 8, and 9. The brackets 86 at the ends of the frame form with the transverse frame member 84 a channel opening rearwardly to limit the forward movement of the U-shaped support 92 and the outer frame member or conduit support 96. A U-shaped support or upwardly open channel 92 is pivotally mounted on the frame 84 by means of a pivot pin 94 inwardly of each of the brackets 86, the U-shaped support 92 being provided with an opening 93 which aligns with the openings 88 in one position of the support 92, as shown in Figs. 8 and 9. The outer frame or conduit support members 96 are each pivotally mounted within one of the U-shaped supports 92 on a pivot pin 98 and are provided with an opening 100 which is adapted to align with the openings 88 in the extended position of the outer frame or conduit support members 96.

As shown more clearly in Figs. 8 and 9, the shear pin 90 extends through the upper opening 88 and the opening 100 in the outer frame member 96 then through the opening 93 in bracket 92 and the lower opening 88 in the frame member 84 to hold the outer frame member in its extended outboard position.

A plurality of downwardly extending arms 102 are provided at their lower extremities with clamping collars 104 for engaging the end portions of a plurality of flexible conduits 106. The depending arms are adjustably mounted on the transverse frame 84 and the outer frames 96 for adjustably positioning the spray nozzles 108 by means of clips 110 which may be secured in various positions by any conventional fastening means such as bolts and nuts 112.

Detachable braces 114 may be provided for holding the outer frame members 96 in their folded position, as best shown in Fig. 1. These braces may be detachably secured by threaded bolts or by pins. This arrangement facilitates moving the apparatus through relatively narrow spaces such as a gate or along the highway.

It will be obvious that with the outer frame members in their extended position and with the shear pin 90 extending through the aligned openings 88, 100 and 93, the arms 102 may be adjusted to direct the spray on a plurality of rows of crops and should the outer arms 102, the hose 106, or the spray nozzles 108 strike any object such as a tree stump or boulder, the pin 90 will be sheared and the outer frame member 96 will swing rearwardly without any damage to the apparatus. Shear pin 90 can be readily replaced in the field and the operator can continue with his crop dusting without any appreciable delay.

While the apparatus has been shown with five flexible conduits 106 extending from the outlets 38 with one of the outlets stopped off by a cap 116, it will be obvious that any number of flexible conduits may be utilized depending upon the arrangement and spacing of the rows and how many rows it is desired to spray at one time.

With the present arrangement three or four rows may be sprayed with the outer frame members completely removed by suitably arranging and spacing the adjustable arms 102 at different positions along the frame member 84. With the frame members 96 in the extended position all six of the outlets may be utilized with six conduits extending to as many spray nozzles and held by six of the arms 102 suitably secured on the frame member 96. The whole arrangement is extremely flexible and can be readily modified and changed without any substantial changes in the structure to accommodate any conditions of field operation.

It will be obvious to those skilled in the art that various changes may be made in the invention without departing from the spirit and scope thereof and therefore this invention is not limited by that which is shown in the drawings or by that which is described in the specification, but only as indicated in the appended claims.

What is claimed is:

1. Means for carrying duster conduits comprising a transverse frame member adapted to be supported on a vehicle, a bracket secured to each end of said transverse frame member, a U-shaped support pivotally mounted on a vertical axis on said transverse frame member adjacent each of said brackets, a conduit support member pivotally mounted on a horizontal axis in each of said supports, said U-shaped supports and conduit support members being movable from a position inwardly of said brackets to a position between the corresponding said bracket and said transverse frame member, said corresponding bracket, conduit support member, U-shaped support and transverse frame member being provided with aligned openings, and shear pins extending through said aligned openings to prevent movement of each of said conduit support members about its vertical axis except under abnormal strain.

2. Means for carrying duster conduits comprising a transverse frame member adapted to be supported on a vehicle, a bracket secured to each end of said transverse frame member, a U-shaped support pivotally mounted on a vertical axis on said transverse frame member adjacent each of said brackets, a conduit support member pivotally mounted on a horizontal axis in each of said U-shaped supports, said U-shaped supports and conduit support members being movable from a position inwardly of said brackets to a position between said bracket and said transverse frame member, said brackets at the ends of said transverse frame member forming with a portion of said transverse frame member a channel structure to receive the U-shaped support and conduit support member and constitute a stop to limit the forward movement thereof, said corresponding bracket, conduit support member, U-shaped support and transverse frame member being provided with aligned openings, and shear pins extending through said aligned openings to prevent movement of each of said conduit support members about its vertical axis except under abnormal strain.

3. Means for carrying duster conduits comprising a transverse frame member adapted to be supported on a vehicle, a bracket secured to each end of said transverse frame member, channel members pivotally mounted on a vertical axis on the upper side of the transverse frame member adjacent each of said brackets with the open portion of the channel facing upwardly, a conduit support member pivotally mounted on a horizontal axis in each of said channel members, said channel members and conduit support members being movable from a position inwardly of said brackets to a position between the corresponding said bracket and said transverse frame member, said corresponding bracket, conduit support member, channel member and transverse frame member being provided with aligned openings, and shear pins extending through said aligned openings to prevent movement of each of said conduit support members about its vertical axis except under abnormal strain.

References Cited in the file of this patent

UNITED STATES PATENTS

| Number | Name | Date |
| --- | --- | --- |
| Re. 4,939 | Brinton | June 11, 1872 |
| 2,101,317 | Lemieux | Dec. 7, 1937 |
| 2,210,346 | Stayton | Aug. 6, 1940 |
| 2,356,950 | Root | Aug. 29, 1944 |
| 2,554,432 | Walters | May 22, 1951 |